United States Patent
Tee et al.

(10) Patent No.: US 11,270,217 B2
(45) Date of Patent: Mar. 8, 2022

(54) SYSTEMS AND METHODS IMPLEMENTING AN INTELLIGENT MACHINE LEARNING TUNING SYSTEM PROVIDING MULTIPLE TUNED HYPERPARAMETER SOLUTIONS

(71) Applicant: Intel Corporation, Santa Clara, CA (US)

(72) Inventors: Kevin Tee, San Francisco, CA (US); Michael McCourt, San Francisco, CA (US); Patrick Hayes, San Francisco, CA (US); Scott Clark, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/194,192

(22) Filed: Nov. 16, 2018

(65) Prior Publication Data

US 2019/0156229 A1 May 23, 2019

Related U.S. Application Data

(60) Provisional application No. 62/587,827, filed on Nov. 17, 2017.

(51) Int. Cl.
*G06N 7/00* (2006.01)
*G06N 20/00* (2019.01)

(52) U.S. Cl.
CPC ............... *G06N 7/00* (2013.01); *G06N 20/00* (2019.01)

(58) Field of Classification Search
CPC ............................... G06N 20/00; G06N 7/005
See application file for complete search history.

(56) References Cited

U.S. PATENT DOCUMENTS 7,363,281 B2  4/2008  Jin et al.
8,364,613 B1  1/2013  Lin et al.
(Continued)

FOREIGN PATENT DOCUMENTS

WO    2018213119    11/2018

OTHER PUBLICATIONS

Golovin, D., et al., "Google Vizier: A Service for Black-Box Optimization", 2017, KDD '17 Proceedings of the 23rd ACM SIGKDD International Conference on Knowledge Discovery and Data Mining, pp. 1487-1495, Halifax, NS, Canada—Aug. 13-17, 2017 (Year: 2017).*

(Continued)

*Primary Examiner* — Eric Nilsson
(74) *Attorney, Agent, or Firm* — Hanley, Flight & Zimmerman, LLC

(57) ABSTRACT

Systems and methods include receiving a tuning work request for tuning hyperparameters of a third-party model or system; performing, by a machine learning-based tuning service, a first tuning of the hyperparameters in a first tuning region; identifying tuned hyperparameter values for each of the hyperparameters based on results of the first tuning; setting a failure region based on the tuned hyperparameter values of the first tuning; performing, by the machine learning-based tuning service, a second tuning of the hyperparameters in a second tuning region that excludes the failure region; identifying additional tuned hyperparameter values for each of the hyperparameters based on results of the second tuning; and returning the tuned hyperparameter values and the additional hyperparameter values for implementing the third-party model or system with one of the tuned hyperparameter values and the additional hyperparameter values.

24 Claims, 6 Drawing Sheets

(56) References Cited

U.S. PATENT DOCUMENTS

| | | | |
|---|---|---|---|
| 9,786,036 | B2 | 10/2017 | Annapureddy |
| 9,858,529 | B2 * | 1/2018 | Adams .................. G06N 7/005 |
| 10,217,061 | B2 | 2/2019 | Hayes et al. |
| 10,282,237 | B1 | 5/2019 | Johnson et al. |
| 10,379,913 | B2 | 8/2019 | Johnson et al. |
| 10,445,150 | B1 | 10/2019 | Johnson et al. |
| 10,528,891 | B1 | 1/2020 | Cheng et al. |
| 10,558,934 | B1 | 2/2020 | Cheng et al. |
| 10,565,025 | B2 | 2/2020 | Johnson et al. |
| 10,607,159 | B2 | 3/2020 | Hayes et al. |
| 10,621,514 | B1 | 4/2020 | Cheng et al. |
| 10,740,695 | B2 | 8/2020 | Cheng et al. |
| 2007/0019065 | A1 | 1/2007 | Mizes |
| 2008/0183648 | A1 | 7/2008 | Goldberg et al. |
| 2009/0244070 | A1 | 10/2009 | Mattikalli et al. |
| 2010/0083196 | A1 | 4/2010 | Liu |
| 2015/0288573 | A1 | 10/2015 | Baughman et al. |
| 2016/0110657 | A1 | 4/2016 | Gibiansky et al. |
| 2016/0132787 | A1 | 5/2016 | Drevo et al. |
| 2016/0232540 | A1 | 8/2016 | Gao et al. |
| 2017/0124487 | A1 | 5/2017 | Szeto et al. |
| 2018/0121797 | A1 | 5/2018 | Prabhu et al. |
| 2018/0129892 | A1 | 5/2018 | Bahl et al. |
| 2018/0240041 | A1 | 8/2018 | Koch et al. |
| 2018/0336493 | A1 | 11/2018 | Hayes et al. |
| 2018/0356949 | A1 | 12/2018 | Wang et al. |
| 2019/0220755 | A1 | 7/2019 | Carbune et al. |
| 2020/0111018 | A1 * | 4/2020 | Golovin .................. G06N 5/003 |
| 2020/0151029 | A1 | 5/2020 | Johnson et al. |
| 2020/0202254 | A1 | 6/2020 | Hayes et al. |
| 2020/0302342 | A1 | 9/2020 | Cheng et al. |

OTHER PUBLICATIONS

Gardner, J. R., et al., "Bayesian Optimization with Inequality Constraints", 2014, Proceedings of the 31 st International Conference on Machine Learning, Beijing, China, 2014. (Year: 2014).*

Zou, H., et al., "Regularization and variable selection via the elastic net", 2005, J. R. Statist. Soc. B, 67, Part 2, pp. 301-320 (Year: 2005).*

G.I. Diaz, A. Fokoue, G. Nannicini, H. Samulowitz, "An effective algorithm for hyperparameter optimization of neural networks", IBM Journal of research and development, vol. 61, No. 4/5 2017. pages 1-19 (Year: 2017).*

Bergstra et al., "Hyperopt: a Python Library for Model Selection and Hyperparameter Optimization," Computational Science & Discovery, 2015, 25 pages.

Zhou et al., "Combining Global and Local Surrogate Models to Accelerate Evolutionary Optimization," IEEE Transactions on Systems, Man, and Cybernetics—Part C: Applications and Reviews, vol. 37, No. 1, Jan. 2007, 11 pages.

* cited by examiner

SYSTEMS AND METHODS IMPLEMENTING AN INTELLIGENT MACHINE LEARNING TUNING SYSTEM PROVIDING MULTIPLE TUNED HYPERPARAMETER SOLUTIONS

CROSS-REFERENCE TO RELATED APPLICATIONS

This application claims the benefit of U.S. Provisional Application No. 62/587,827, filed 17 Nov. 2017, which is incorporated herein in its entirety by this reference.

TECHNICAL FIELD

The inventions relate generally to the computer optimization and machine learning fields, and more specifically to a new and useful system and implementation of a tuning service that tunes hyperparameters of computer-based models in the computer optimization and machine learning fields.

BACKGROUND

Modern machine learning capabilities are rapidly changing and improving how some of the most complex and data-intensive computing problems are solved. A performance of a machine learning model is governed mainly in the manner(s) in which the machine learning model is trained using data samples as machine learning training input and based on the hyperparameters of the machine learning model set prior to the training of the model. As referenced in passing the hyperparameters of the machine learning models are parameters whose values are set prior to the commencement of the machine learning process rather than derived by the machine learning model during training. Examples include the number of trees in a random forest or the number of hidden layers in a deep neural net. Adjusting the values of the hyperparameters of a machine learning model by any amount typically results in a large impact on a performance of the machine learning model.

However, many existing machine learning models are not implemented with optimal hyperparameters well-suited for achieving the best predictive performances. Rather, the many existing machine learning models are implemented with default hyperparameters that have not been optimized for a specific computing problem for which the machine learning models are being used.

Additionally, any existing system that enables optimization of hyperparameters of a machine learning model typically includes an extremely complex interface that may require significant coding capabilities and comprehension of the underlying software and hardware components of the system. Thus, making it difficult to efficiently and effectively enable optimizations and subsequent improvements of the machine learning models.

Thus, there is a need in the machine learning field to create an improved optimization platform to test and improve machine learning models (e.g., in-product machine learning models) and an associated Application Program Interface that enables developers to efficiently and effectively interact with a robust system implementing the evaluation framework. The embodiments of the present application described herein provide technical solutions that address, at least, the need described above, as well as the technical deficiencies of the state of the art described throughout the present application.

SUMMARY OF THE INVENTION

In one embodiment, a system for tuning hyperparameters for improving an effectiveness including accuracy and computational performances of a machine learning model includes a machine learning-based tuning service that is hosted on a distributed networked system that: receives a tuning work request for tuning two or more hyperparameters of a third-party machine learning model; performs, by the machine learning-based tuning service, a first tuning of the two or more hyperparameters in a first tuning region; identifies tuned hyperparameter values for each of the two or more hyperparameters based on results of the first tuning; sets a failure region based on the tuned hyperparameter values of the first tuning; performs, by the machine learning-based tuning service, a second tuning of the two or more hyperparameters in a second tuning region that excludes the failure region; identifies additional tuned hyperparameter values for each of the two or more hyperparameters based on results of the second tuning; and returns the tuned hyperparameter values and the additional hyperparameter values for implementing the third-party machine learning model with one of the tuned hyperparameter values and the additional hyperparameter values.

In one embodiment, the first tuning region comprises a predetermined range of values for each of the two or more hyperparameters of the tuning work request.

In one embodiment, the second tuning region comprises the predetermined range of values for each of the two or more hyperparameters of the tuning work request excluding a range of values for each of the two or more hyperparameters within the failure region.

In one embodiment, setting the failure region includes: identifying an area surrounding the tuned hyperparameter values; and defining the failure region based on the area surrounding the tuned hyperparameters values.

In one embodiment, the tuned hyperparameter values define a point on a multidimensional coordinate system, and identifying the area surrounding the tuned hyperparameter values includes identifying the area surrounding the point.

In one embodiment, setting the failure region includes: identifying a radial distance; identifying an area surrounding the tuned hyperparameters values based on setting the radial distance from the tuned hyperparameter values; and defining the failure region based on the area surrounding the tuned hyperparameter values.

In one embodiment, setting the failure region includes: setting dimensions of the failure region including identifying an elastic region that surrounds the tuned hyperparameters values of the first tuning.

In one embodiment, the machine learning-based tuning service: uses the failure region to adjust one or more parameters of one or more tuning sources operated by the machine learning-based tuning service for identifying hyperparameter values for the two or more hyperparameters of the tuning work request.

In one embodiment, performing the second tuning includes: generating a plurality of prospective values for the two or more hyperparameters using the adjusted one or more tuning sources.

In one embodiment, performing the second tuning includes: generating a plurality of prospective values for the two or more hyperparameters; applying the failure region to the plurality of prospective values for the two or more hyperparameters; and excluding a subset of the plurality of prospective values for the two or more hyperparameters that fall within the failure region.

In one embodiment, the failure region is defined by a non-polygonal shape surrounding the tuned hyperparameter values.

In one embodiment, the non-polygonal shape of the failure region comprises a circle.

In one embodiment, the failure region is defined by a polygonal shape surrounding the tuned hyperparameter values.

In one embodiment, performing the second tuning includes: setting a tuning distance that defines a position of the second tuning region away from the first tuning region and the failure region, wherein the second tuning satisfies or exceeds a diversity threshold.

In one embodiment, the machine learning-based tuning service implements an intelligent hyperparameter tuning system comprising: a cluster of distinct machine learning tuning sources that perform distinct tuning operations of the two or more hyperparameters of third-party machine learning model; a plurality of queue worker machines that selectively operate one or more of the cluster of distinct tuning sources based on a receipt of the tuning work request, wherein the plurality of queue worker machines includes a plurality of distinct queue worker machines that operate asynchronously to perform disparate tuning operations using one or more of the cluster of distinct machine learning tuning sources; a shared work queue that is accessible by each of the plurality of distinct queue worker machines, wherein the shared work queue comprises an asynchronous queue that enable asynchronous tuning operations by the plurality of queue worker machines; and a platform database comprising a central repository that collects tuning data generated during tuning sessions of the two or more hyperparameters of the third-party machine learning model.

In one embodiment, the hyperparameters comprise parameters of the third-party machine learning model having values set before a training or a learning process applied to the third-party machine learning model and are not derived during the training or the learning processing.

In one embodiment, a method for tuning hyperparameters for improving an effectiveness including accuracy and computational performances of a machine learning model includes receiving a tuning work request for tuning two or more hyperparameters of a third-party machine learning model; performing, by a machine learning-based tuning service, a first tuning of the two or more hyperparameters in a first tuning region; identifying tuned hyperparameter values for each of the two or more hyperparameters based on results of the first tuning; setting a failure region based on the tuned hyperparameter values of the first tuning; performing, by the machine learning-based tuning service, a second tuning of the two or more hyperparameters in a second tuning region that excludes the failure region; identifying additional tuned hyperparameter values for each of the two or more hyperparameters based on results of the second tuning; and returning the tuned hyperparameter values and the additional hyperparameter values for implementing the third-party machine learning model with one of the tuned hyperparameter values and the additional hyperparameter values.

In one embodiment, the hyperparameters comprise parameters of the third-party machine learning model having values set before a training or a learning process applied to the third-party machine learning model and are not derived during the training or the learning processing.

In one embodiment, setting the failure region includes: identifying an area surrounding the tuned hyperparameter values, wherein the tuned hyperparameter values define a point on a multidimensional coordinate system, and wherein identifying the area surrounding the tuned hyperparameter values includes identifying the area surrounding the point; and defining the failure region based on the area surrounding the tuned hyperparameters values.

In one embodiment, a computer-implemented method for tuning hyperparameters of one or more of a machine learning model, a complex system, a model, and a simulation includes at a remote tuning service, the remote tuning service being hosted on a distributed networked system of hardware computing servers: receiving a tuning work request for tuning two or more hyperparameters of a third-party model or system; performing, by a machine learning-based tuning service, a first tuning of the two or more hyperparameters in a first tuning region; identifying tuned hyperparameter values for each of the two or more hyperparameters based on results of the first tuning; setting a failure region based on the tuned hyperparameter values of the first tuning; performing, by the machine learning-based tuning service, a second tuning of the two or more hyperparameters in a second tuning region that excludes the failure region; identifying additional tuned hyperparameter values for each of the two or more hyperparameters based on results of the second tuning; and returning the tuned hyperparameter values and the additional hyperparameter values for implementing the third-party model or system with one of the tuned hyperparameter values and the additional hyperparameter values.

DESCRIPTION OF THE PREFERRED EMBODIMENTS

Figure 1:
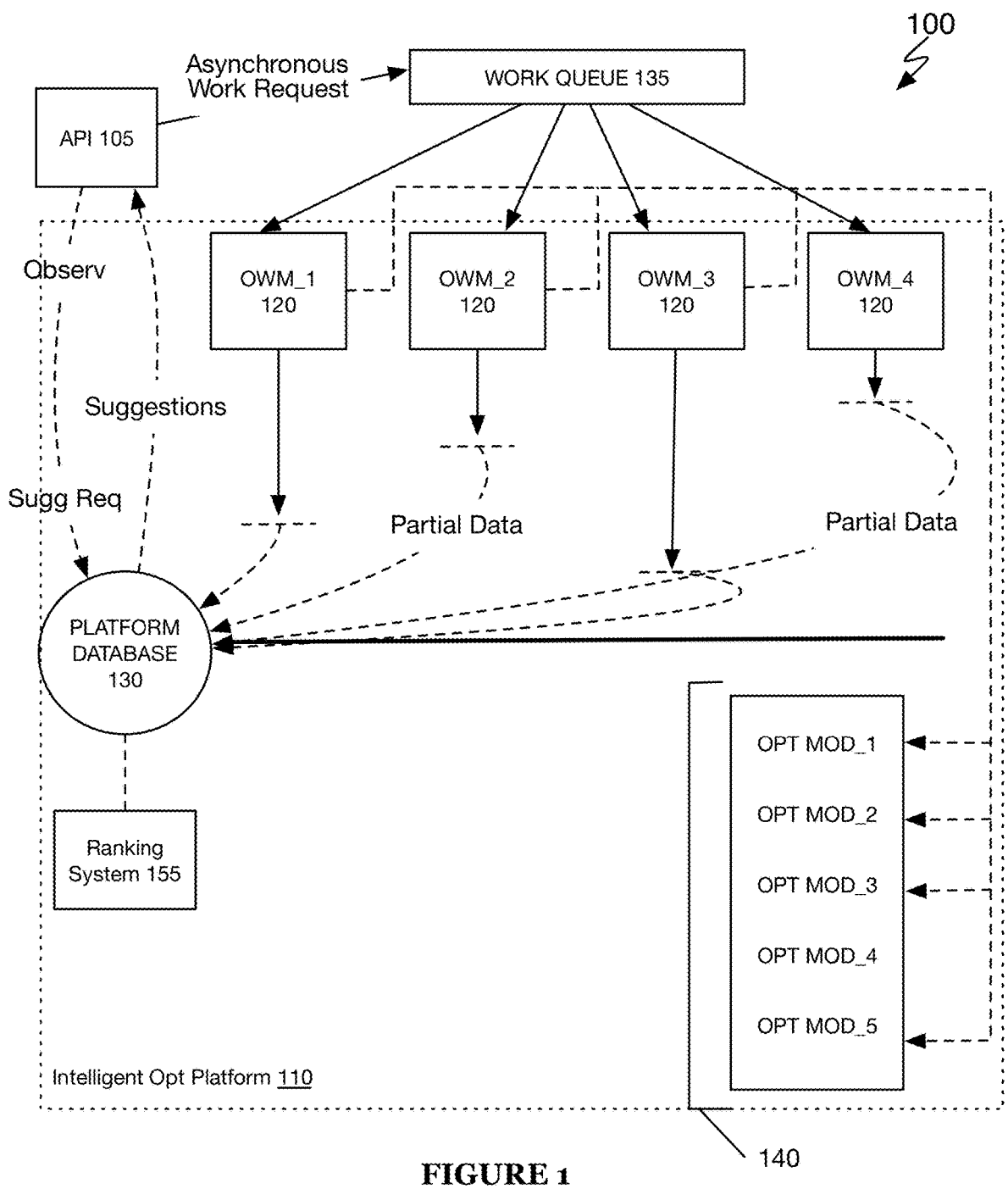
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing machine learning models tend to lack in predictive performance as well as speed in computation due to a lack of optimal hyperparameters used in the machine learning models during training. The lack of optimized hyperparameters well-suited to an underlying computing problem or the like adversely affect the computational capabilities of the machine learning model, in that, the resulting predictions or solutions of the model may not be accurate and the speed of computation of the machine learning model may be slow because the un-optimized or poorly optimized hyperparameters of the model may result in an increased workload (e.g., increased required computer processing, increased required data storage, etc.) to the computing system implementing the model and thereby resulting in many inefficiencies therein.

Additionally, even in the circumstance that an attempt is made to optimize some of the hyperparameters of a machine learning model, the attempt to optimize the hyperparameters may fail due to many common optimization errors including: using inappropriate metrics and assumptions to test hyperparameters of an associated machine learning model or the like; overfitting a machine learning model during training that often results in a poor fit of the model to out of sample data or unseen data; using too few hyperparameters and failing to optimize all hyperparameters of a machine learning model; unskilled or improper hand-tuning, which is a highly inefficient optimization strategy at which humans are poor at performing high dimensional, non-convex optimization; grid searching over a space of possible hyperparameters which may grow the number of times a machine learning model must be evaluated due to an increase in dimensionality (i.e., increased hyperparameters); random searching which uses no intelligence in the optimization method and may result in unnecessarily high variance.

Accordingly, unintelligent optimization attempts of hyperparameters (or other model parameters) may result in high computational costs (e.g., high computer processing resources expenditures, etc.).

The embodiments of the present application, however, provide an intelligent optimization platform that functions to optimize hyperparameters and/or parameters of any type of model with significantly fewer evaluation thereby saving computational resources while greatly improving an overall performance of a model. In embodiments of the present application, the intelligent optimization platform includes an ensemble of parameter optimization models, which may include a combination of several distinct machine learning models and Bayesian optimization algorithms that may work in selective combinations to expediently tune hyperparameters or various parameters of complex external systems, simulations, and models.

Further, the embodiments of the present application include an intuitive and simplified Application Programming Interface (API) that enables users and/or developers to easily configure a work request, such as a hyperparameter optimization work request. A hyperparameter optimization work request as referred to herein generally relates to a request to optimize one or more hyperparameters of a model. The hyperparameter optimization work request may include an identification of the hyperparameters a user desires to optimize together with constraints or parameters required for experimenting or performing optimization trials using the system and/or methods described herein. The optimization work request may generally be generated using an API of the system 100, as described below. In a preferred embodiment, the optimization work request functions to trigger an operation of the intelligent optimization platform performing computations using the hyperparameters of the optimization work request. Additionally, in embodiments of the present application, using a limited number of simplified API calls, it is possible to integrate the sophisticated ensemble of Bayesian optimization techniques of the intelligent optimization platform to augment an existing machine learning pipeline.

Collaboratively, the intelligent optimization platform preferably functions to improve the computational capabilities of a machine learning model, such that the machine learning model performs at high levels of accuracy and further, computes predictions, suggestions, and other outcomes faster (e.g., up to one hundred times faster or more improvement in machine learning models, etc.) than un-optimized or poorly optimized machine learning models or other models. This, in turn, improves the functionality and operational speed and efficiency of the underlying computing system executing the machine learning model or other model.

1. System for Implementing an Intelligent API

As shown in FIG. 1, a system 100 includes an intelligent application program interface (API) 105, an intelligent model optimization platform 110, a plurality of queue working machines 120, a platform database 130, a shared work queue 135, and an ensemble of optimization models 140.

The system 100 preferably implements an intelligent model optimization platform 110 including an ensemble of Bayesian optimization processes and machine learning techniques that functions to automate an optimization of features of a model, architecture of a model, and hyperparameters of a model using an ensemble of Bayesian optimization techniques, as described in U.S. application Ser. No. 15/977,168, which is incorporated herein in its entirety by this reference.

The system 100 functions to implement an intelligent Application Program Interface (API) 105 for interacting and implementing complex optimization trials via the remote intelligent optimization platform 110. The API 105 may be specifically designed to include a limited number of API endpoints that reduces the complexities of creating an optimization work request, implementing optimization trials using the work request data, obtaining suggestions and/or results of the optimization trials, and potentially implementing an optimization feedback loop until a suitable optimization of an objective function of the work request is achieved in a minimal amount of time, as described in U.S. application Ser. No. 16/173,737, which is incorporated herein in its entirety by this reference. The optimization work request, as referred to herein, generally relates to an API request that includes one or more hyperparameters that a user is seeking to optimize and one or more constraints that the user desires for the optimization trials performed by the intelligent optimization platform 110.

In a preferred embodiment, the API 105 comprises a Representational State Transfer (ReST) API that relies mainly on a stateless, client-server, cacheable communications protocol and in many cases, the Rest API uses the HTTP protocol in connecting and interacting with software applications over the web and cloud (distributed network systems) services efficiently.

Figure 4:
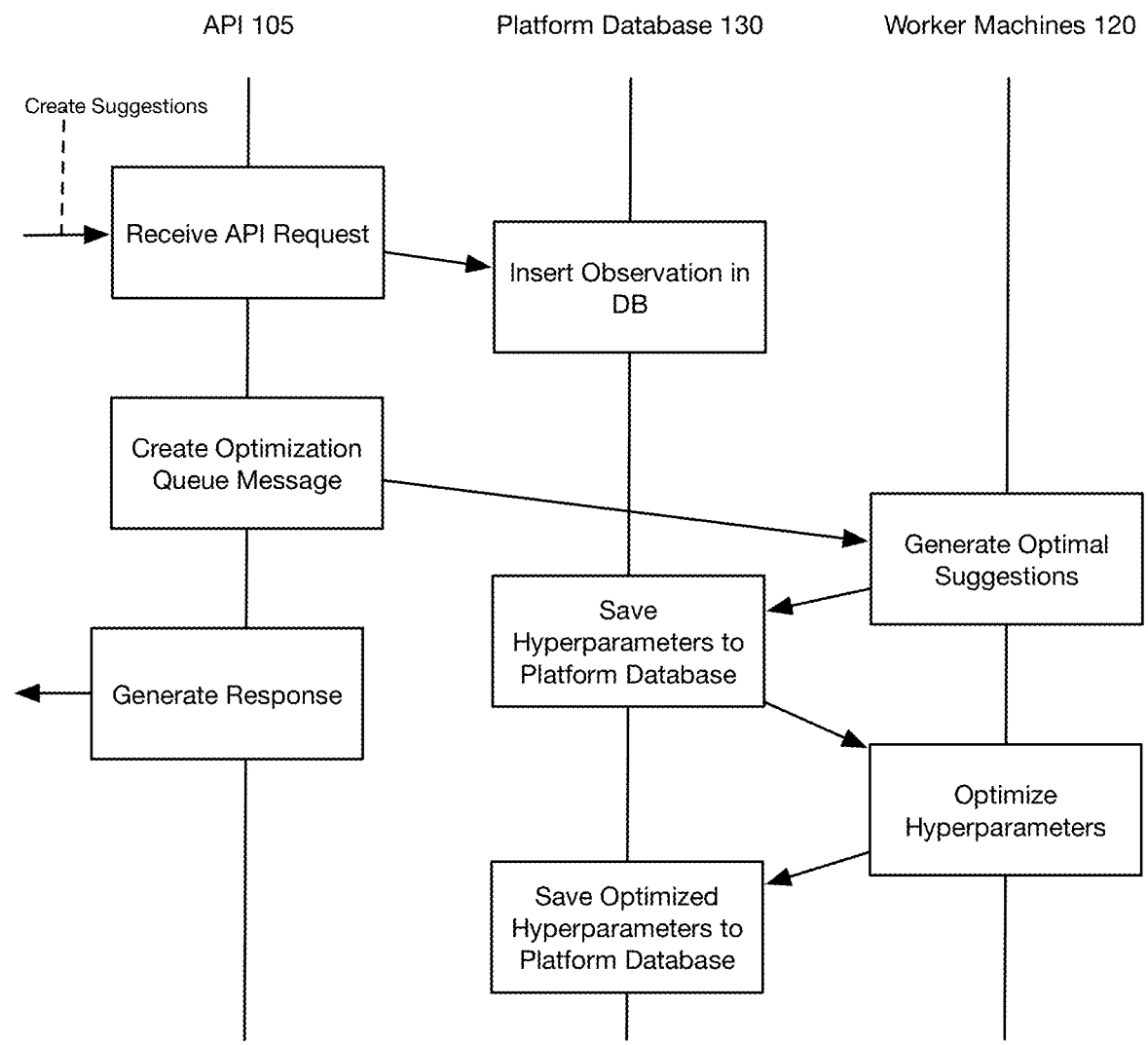
FIG. 4 illustrates schematic representation of a mixed system and process flow for implementing an intelligent optimization platform in accordance with one or more embodiments of the present application.

The API 105 may additionally be configured with logic that enables the API 105 to intelligently parse optimization work request data and/or augment the optimization work request data with metadata prior to passing the optimization work request to the shared work queue 135 of the intelligent optimization platform 110. As shown in FIG. 4, a mixed system and process flow is provided that illustrates an example interactions between the API 105 and one or more components of the intelligent optimization platform 110.

The intelligent optimization platform 110 includes the plurality of queue worker machines 120 (which may also be referred to herein as optimization worker machines), the platform data 130, the shared work queue 135 and the ensemble of optimization models 140. The intelligent optimization platform 110 generally functions to interact with the API server implementing the API 105 to receive API requests for implementing new optimization work requests and returning responses or suggestions to the API 105. Using the plurality of intelligent queue worker machines 120, the intelligent optimization platform 110 functions to asynchronously execute a plurality of optimization work requests in real-time and in parallel. This asynchronous execution and parallel processes of the intelligent optimization system 110 provides speed in computing efficiencies in the exploration and exploitation processes (generally, optimization) of features, hyperparameters, models and system architectures.

Figure 3:
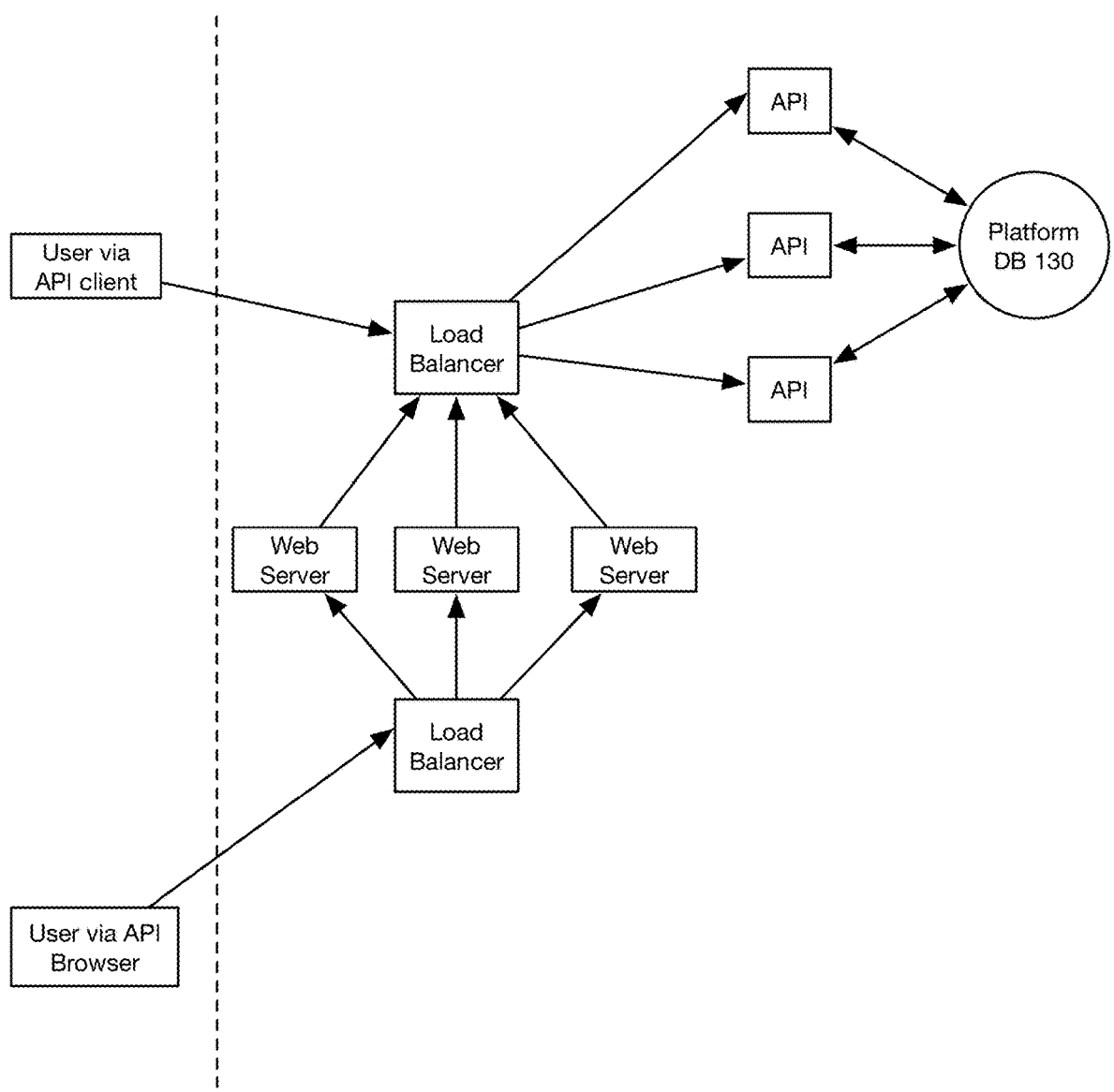
FIG. 3 illustrates a schematic representation of a system for implementing an intelligent API in accordance with one or more embodiments of the present application.

As shown by way of example in FIG. 3, the system enables a user to implement and/or interact with the API 105 in multiple ways including via an API client application and/or via API web browser implemented over the web.

The intelligent optimization platform 110 may be implemented using a combination of computing servers. Preferably, the intelligent optimization platform is implemented via a distributed networked computing system, such as cloud computing systems, that allows the many processes implemented by the intelligent optimization platform 110 to be implemented in parallel and among disparate computers thereby, in some embodiments, mitigating the possibility of failure or bottlenecking in the optimization pipeline of the intelligent optimization platform 110. Accordingly, the intelligent optimization platform 110 may be implemented as a remote web service accessible by multiple clients over the Internet, the Web, or any suitable communication network (e.g., a global area network, a wide area network, a local area network, etc.) that may function to place disparate computing resources in operable connection and communication.

The plurality of intelligent queue worker machines 120 preferably relate to services operating on the intelligent optimization platform 110 that executes code asynchronously with respect to other services or queue working machines of the platform 110. In some embodiments, each of the plurality of intelligent queue worker machines 120 functions to selectively trigger one or more optimization requests to one or more optimization engines of the ensemble of optimization engines 140. And, once the work on the optimization request is completed by the selected optimization engine(s), the queue working machine returns the responses or results to the platform database 130.

The plurality of intelligent queue worker machines 120 may be specifically configured with logic that enables each of the machines 120 to make dynamic and intelligent decisions in the selections of an ensemble component of the plurality of ensemble of optimization models 140. That is, each of the plurality of intelligent queue worker machines may function to selectively choose one or more optimization models of the ensemble 140 to execute one or more portions of an optimization work request.

The ensemble of optimization models 140 preferably includes a plurality of disparate optimization models that operate to optimize hyperparameters, features, models, system architectures and the like using varying optimization algorithms. In a preferred embodiment, the ensemble of optimization models 140 define a core optimization engine of the intelligent optimization platform 110. The features and the parameters of the core optimization engine comprising the ensemble of optimization models 140 may also be optimized continually by one or more of the intelligent queue worker machines 120 (e.g., using Hyperopt, etc.).

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together. Each of these models may be individually selectable or selectable in combination by or using the intelligent worker queue machines 120.

In a preferred embodiment, the plurality of intelligent queue working machines 120 may be implemented on a separate computing server than the API 105. In this way, long-running asynchronous processes do not adversely affect (e.g., slow down) a performance of an API computing server and mainly, a capacity of the API computing server to service API requests.

Additionally, the plurality of intelligent queue worker machines 120 include multiple, distinct intelligent queue worker machines 120 that coordinate optimization work request from the shared work queue 135 received via the API 105 with the ensemble of optimization models 140.

A first example intelligent queue working machine may function to implement Modelfit or Hyperopt that typically functions to tune one or more of the hyperparameters of the optimization models of the ensemble concurrently with the processing of the optimization work requests received via the API 105. In one implementation, Modelfit or Hyperopt may be used to tune hyperparameters of one of the optimization models of the ensemble 140. After receiving a set of observations based on the suggestions for the set of hyperparameters, the first queue worker machine may implement Modelfit or Hyperopt to model fit the hyperparameters of the selected optimization models in order to generate improved and new values for the set of hyperparameters via Nextpoints or the like. A queue worker implementing Nextpoints may function to predict or suggest a new set of suggestions that include new parameter values for a given model. In some embodiments, the first queue worker machine may function to optimize the hyperparameters of the selected optimization models based on an evaluation a set of observations returned by a user.

A second example intelligent queue working machine may function to implement Nextpoints that typically functions to generate or suggest new, optimized values for the hyperparameters of the optimization work request. Accordingly, such intelligent queue working machine may function to select one or more of the optimization models of the ensemble 140, such as one or more machine learning models, for generating the new, optimized hyperparameter values.

A third example intelligent queue working machine may function to implement an Importance algorithm that typically functions to judge or determine an importance of the hyperparameters submitted with the optimization work request (e.g., hyperparameters of an external model). This example intelligent queue worker machine may additionally function to analyze and determine an importance of features, hyperparameters, and architectures of the optimization models with respect to a given optimization work request; meaning the identified importance hyperparameters, features, or the like may have a significant impact on an account of a suggestion or generated hyperparameter values. Accordingly, the intelligent queue worker machine of such example may function to recognize different hyperparameters and/or features of an optimization model as being important and non-important based on the optimization work request data (e.g., based on the hyperparameters to be optimized). Thus, the intelligent queue worker machine may function to assign or attribute distinct importance values to the hyperparameters and/or features of the optimization models so that these hyperparameters and the like may be ranked and considered with greater weight in a correlated process, such as re-tuning via Hyperopt or the like.

It shall be noted that the plurality of intelligent optimization worker machines 120 may not be limited to the above-noted examples, but rather is an extensible group of intelligent machines that may be modified to include additional and/or different intelligent worker machines.

The platform database 130 functions to collect and stores any or all values generated by the system 100 including values generated when executing an optimization work request by the intelligent optimization platform 110. Specifically, each of the plurality of intelligent queue worker machines may function to store within the platform database 130 optimized hyperparameter values, optimized hyperparameter values of an optimization work request, suggestions, surrogate models, partial information responses, and the like. The API 105 may be in operable communication with the platform database 130 via a communication network and may function to pull suggestions and/or response data via an API call or request.

The machine learning models, optimization models, and/or the ensemble of machine learning models may employ any suitable optimization algorithms and/or machine learning algorithms including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the intelligent optimization platform 110 and/or other components of the system 100.

The system 100 may additionally include a surrogate model generator (implemented via one or more of the optimization models 140) that may be implemented by the intelligent optimization platform 110. Specifically, when an API request is received by the system 100 that requests a status or suggestions of a partially completed (or incomplete) optimization work request, the intelligent optimization platform 110 may function to identify candidate data points and other data (including suggested hyperparameter values and optimized hyperparameters values) generated by each of the plurality of intelligent queue worker machines 120 for responding to the partially completed optimization work request and further, may trigger one or more of the optimization models of the ensemble of optimization models to generate a surrogate (or proxy) model that can be used to test the uncertainty and/or the likelihood that a candidate data point would perform well in an external model. In one example, the system 100 may function to obtain hyperparameter values of a most recent job of a first intelligent queue worker machine implementing Hyperopt and cause one of the optimization models 140, such as MOE, to generate the surrogate model using the hyperparameter values to test how well the candidate hyperparameter value data points may perform.

The system 100 may also implement a ranking system 155 that functions to rank the suggestions for a given optimization work request (or across multiple optimization work requests for a given user) such that the suggestions having hyperparameter values most likely to perform the best can be passed or pulled via the API 105. The ranking system 155 may be implemented in any suitable manner including by the one or more optimization algorithms of the ensemble 140 that generated the suggestions. For instance, if MOE is used to generate a plurality of suggestions for responding to an optimization work request, the system 100 may function to use MOE to implement the ranking system 155.

It shall be noted that the sub-systems and components of the system 100 may be connected or placed in operable communication using any suitable network and any suitable manner. For instance, the components of the system 100 may be connected directly or indirectly over a network. The network may include any public (e.g., the Internet) or private network (e.g., intranet), a virtual private network, a wireless local area network, a local area network, a wide area network, a wireless wide area network, a global area network, a cellular network, any combination of the aforementioned and the like.

Figure 2:
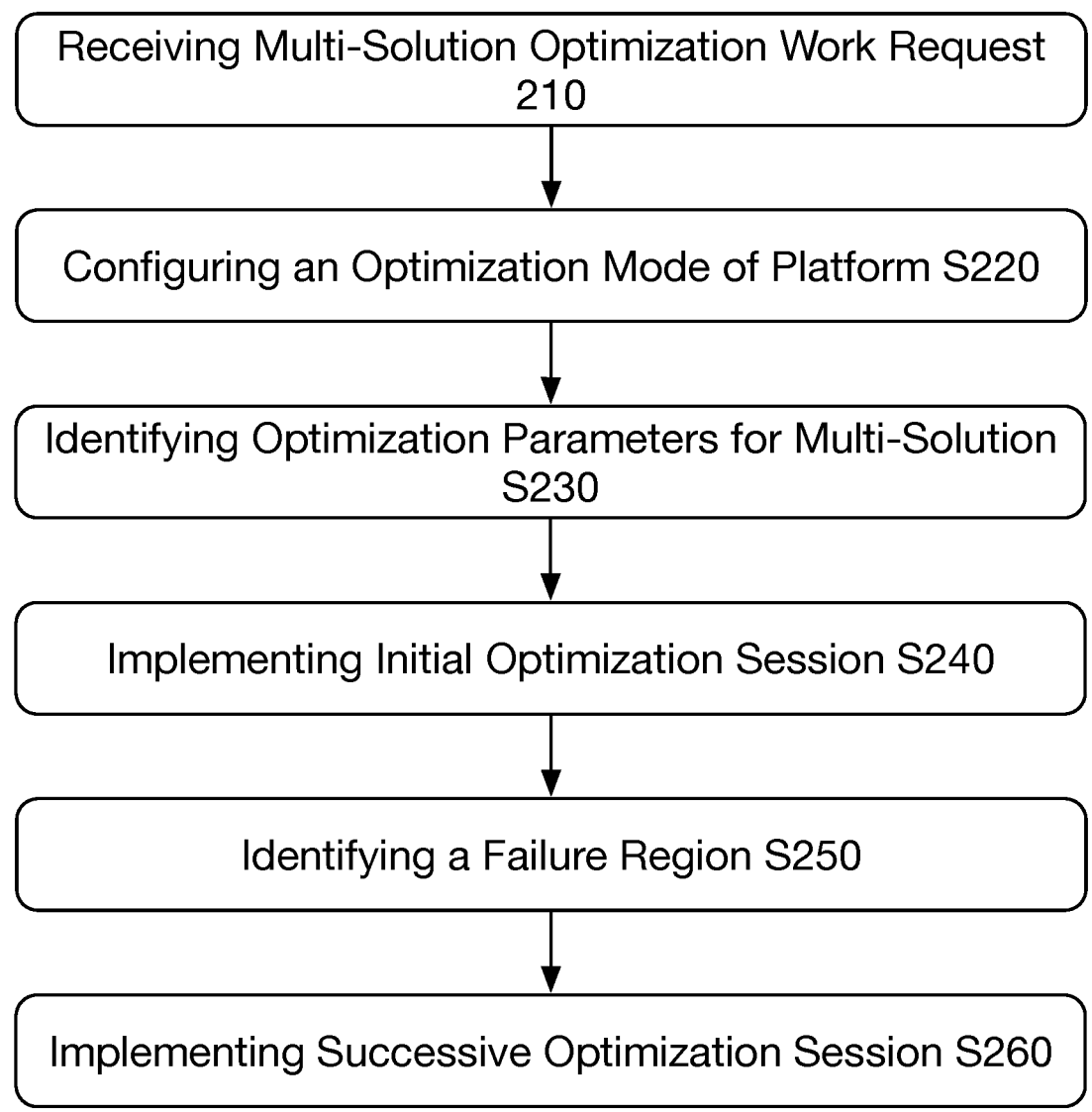
FIG. 2 illustrates a method for implementing an intelligent API in accordance with one or more embodiments of the present application.

2. Method for Identifying Multiple Solutions Using an Intelligent Optimization Platform As shown in FIG. 2, a method 200 for identifying multiple hyperparameter solutions by implementing an intelligent optimization platform includes receiving an optimization work request S210, configuring an optimization mode of the intelligent optimization platform S220, identifying optimization hyperparameters for the multiple solution optimization work request S230, implementing an initial optimization session (set of optimization trials) to identify an optimal suggestion S240, identifying a failure region S250, and implementing a successive optimization session S260.

The method 200 generally functions to enable a generation of multiple solution sets for a single set of hyperparameters of an optimization work request or tuning work request. Specifically, the method 200 may configure an intelligent optimization platform a machine learning-based tuning service, in response to input values provided via an intelligent Application Program Interface (API), such that the intelligent optimization platform generates multiple optimal suggestions for hyperparameter values of a third-party or subscriber model that are sufficiently diverse from each other. In the context of the present application, a diverse suggestion or diverse solution that includes values for a set of hyperparameters may be a best or optimal solution that is adequately distanced from a prior best optimal solution for the same set of hyperparameters. Accordingly, in some embodiments of the present application, a pair (or more) of optimal solutions may be considered diverse when the distance between them exceeds or meets a diversity threshold (e.g., a statistically significant threshold that when is satisfied or exceeded indicates diversity between the pair of optimal solutions).

S210, which includes receiving an optimization work request, functions to receive an optimization work request via an intelligent API. The intelligent API may be implemented as a client application on a client device, such as a web browser, or any suitable interface accessible to a remote user system. Within the API, the remote user may be able to create the optimization work request (or experiment) by providing one or more details of the model hyperparameters along with constraints of optimization trials that a user desires to be optimized by an intelligent optimization platform implemented by a system implementing the method 200.

The optimization work request received by the intelligent optimization platform may include, at a minimum, an identification of hyperparameters of the model that the work request is seeking to optimize. The hyperparameters may be a hyperparameter of a machine learning model, or any type of model. Accordingly, a hyperparameter, as referred to herein, generally relates to a variable that can affect a single optimization trial of an optimization work request. Typically, the number of hyperparameters included in the work request may govern the dimensions of an optimization trial object generated by a system (e.g., system 100) implementing the method 200. For instance, if the optimization work request includes two numeric hyperparameters, such as x and y, a system implementing the method 200 may function to create a two-dimensional optimization trial containing two hyperparameter objects: x and y. A system implementing the method 200 may function to generate values for the hyperparameters of the optimization work request that maximizes a relevant objective or metric of the model that implements the hyperparameters.

The optimization work request may additionally include bounds for each of the hyperparameters. A bound, as referred to herein, typically refers to a range of values that a hyperparameter can occupy. Accordingly, the bounds for a hyperparameter functions as a constraint (e.g., a min/max value constraint) that cannot be exceeded during an optimization trial of the one or more hyperparameters of the optimization work request.

Additional optimization work request inputs may include, but not limited to, conditions, optimization budget, stopping criteria, metadata, number of solutions requested, and the like. These additional optimization work request inputs may function to affect or govern, in some amount, a manner in which the optimization trials are performed or otherwise, reported back via the API. For instance, for a multi-solution optimization work request (i.e., an optimization work request requiring multiple solution sets for hyperparameters), an optimization budget may be required to effectively generate the two or more optimal suggestions for the multi-solution optimization work request. The optimization budget, as referred to herein, may be a value that defines a number of suggestions that the intelligent optimization should generate when attempting to identify an optimal suggestion for hyperparameters. In the case of a multi-solution optimization work request, an optimization budget may be partitioned to generate distinct sets of suggestions for each distinct optimal solution of the multi-solution optimization work request.

S210 may additionally function to detect an optimization work request that includes input requesting the generation of more than one optimal suggestion for hyperparameters of a given model (i.e., input via the API of an integer number of solutions>1) and when coupled with an optimization budget having an input integer value also greater than one, may trigger the system implementing the method 200 to reconfigure a setting of an intelligent optimization platform executing the optimization work request.

S220, which includes configuring the intelligent optimization platform, functions to adjust a basic configuration of the intelligent optimization platform based on input values of a multi-solution optimization work request. Specifically, the detection and/or identification by S210 of an input value (preferably an integer value) greater than one for the requested number of optimally diverse solutions may function to trigger a configuration (or reconfiguration) signal to the intelligent optimization platform. The configuration signal may function to automatically reconfigure settings of one or more optimization models (e.g., optimization sources, optimization algorithms, and/or the like) and/or the settings of one or more operating parameters or rules of the intelligent optimization platform. The one or more operating parameters or rules of the intelligent optimization may generally function to govern in manner in which the intelligent optimization platform executes optimization trials.

In a first implementation, S220 may function to receive or detect a configuration signal based on inputs of the multi-solution optimization work request and automatically reconfigure an optimization mode of the intelligent optimization platform from a first optimization mode to a second optimization mode. Preferably, the first optimization mode includes a single solution optimization mode in which settings of the one or more operating parameters of the intelligent optimization platform are such that the platform only optimizes a set of hyperparameter values provided within an optimization work request to identify a single best set (or optimized) hyperparameter values.

Additionally, or alternatively, if an input value for number of solutions is not provided via the intelligent API or an input of a value of one (1) is provided, the system implementing the method 200 may default to the first optimization mode for a single solution optimization. In this first optimization mode of the intelligent optimization platform, the intelligent optimization platform may absorb an entire optimization budget to perform exploration and/or exploitation trials to identify a single best set of optimized values for hyperparameters.

In the first implementation, the second optimization mode preferably includes a multiple solution optimization in which settings of the one or more operating parameters of the intelligent optimization platform are such that the platform optimizes a set of hyperparameter values of an optimization work request to identify multiple best sets of optimized hyperparameter values. In such circumstance, the number of solutions requested within the optimization work request may function to drive the number of best sets of optimized hyperparameter values that are generated by the intelligent optimization platform. In this second optimization mode of the intelligent optimization platform, the hyperparameters of the optimization models may be adjusted or configured differently than in the first optimization mode and the intelligent optimization platform may function to use only portions of the optimization budget to perform exploration and/or exploitation trials to identify each of the multiple best sets of optimized values for the hyperparameters.

In a second implementation, S220 may function to receive or detect a configuration signal based on inputs of the optimization work request and automatically select one of a plurality of optimization modes of the intelligent optimization platform to generate multiple suggestions comprising multiple sets of optimized hyperparameter values for the optimized work request.

In the second implementation, S220 may function to identify a plurality of pre-existing multiple solution optimization modes of the intelligent optimization platform. In such implementation, there may be several optimization modes for identifying and/or generating multiple best suggestions for hyperparameter values of an optimization work request. S220 may function to automatically select a most optimal one of the plurality of optimization modes based on input values (e.g., number of requested solutions, number of hyperparameters, optimization budget, etc.) of the optimization work request. For instance, when an input value for the number of (diverse) solutions for hyperparameters values is low (e.g., between 2-5 solutions, etc.) and an optimization budget input value is also low (e.g., between 10-15 requested optimization trials), S220 may function to automatically select one of the plurality of optimization modes that limits a use or implementation of exploratory optimization models and increases a use of exploitation optimization models to identify the multiple optimal suggestions faster. Conversely, when an input value for the number of solutions for hyperparameters values is high (e.g., between 30-50 solutions, etc.) and an optimization budget input value is also high (e.g., between 300-400 requested optimization trials), S220 may function to automatically select one of the plurality of optimization modes that increases a use of exploration optimization models and further, increases a use of exploitation optimization models to identify the multiple optimal suggestions most likely with higher accuracy.

It shall be noted that there may be multiple selectable optimization modes of the intelligent optimization platform beyond the above-described examples that include several intermediate optimization models and optimization models that may be selected that exceed the example number of solutions requested and optimization budget values.

In a third implementation, S220 may function to receive or detect a configuration signal based on inputs of the optimization work request and dynamically reconfigure settings of one or more operating parameters of the intelligent optimization platform that enables a generation of multiple suggestions comprising multiple sets of optimized hyperparameter values for the optimized work request.

S220 may function to dynamically reconfigure settings of the one or more operating parameters of the intelligent optimization platform by reconfiguring one or more operating parameters used for selecting exploration optimization models and exploitation optimization models of an ensemble of optimization models, reconfiguring operating parameters that enable reallocation of optimization budget, reconfiguring operating parameters that function to store values from optimization trials, reconfiguring operating parameters that define one or more search spaces for optimal values for the hyperparameters, and the like.

S230, which includes identifying optimization parameters for the multiple solution optimization work request, functions to use one or more of the input values including at least a number of requested solutions and input value for the optimization budget to determine one or more optimization parameters of the optimization trials or tuning sessions for the multiple solution optimization work request.

S230 may function to determine a sub-optimization budget for generating each best solution for a multiple suggestion/solution set of a multi-solution optimization work request. In one example, S230 may function to determine a sub-optimization budget based on dividing an optimization budget value by a number of solutions or suggestions that is requested for a set of hyperparameters of an optimization work request (e.g., num_sol:3, opt_budg: 99; allocate 33 optimization trials for each solution or suggestion for the set of hyperparameters). Alternatively, S230 may function to front load the optimization budget to a first best optimal solution/suggestion for the set of hyperparameters and allocate smaller portions of the optimization for subsequent best solutions.

Additionally, or alternatively, S230 may function to determine a sub-optimization budget by dynamically allocating a portion of a provided observation budget to each suggestion of a multiple suggestion set. That is, S230 may function to determine a sub-optimization budget for each (multi-solution) suggestion as optimization trials are being performed and expended on identifying a best solution (e.g., a first best solution).

Figure 5A:
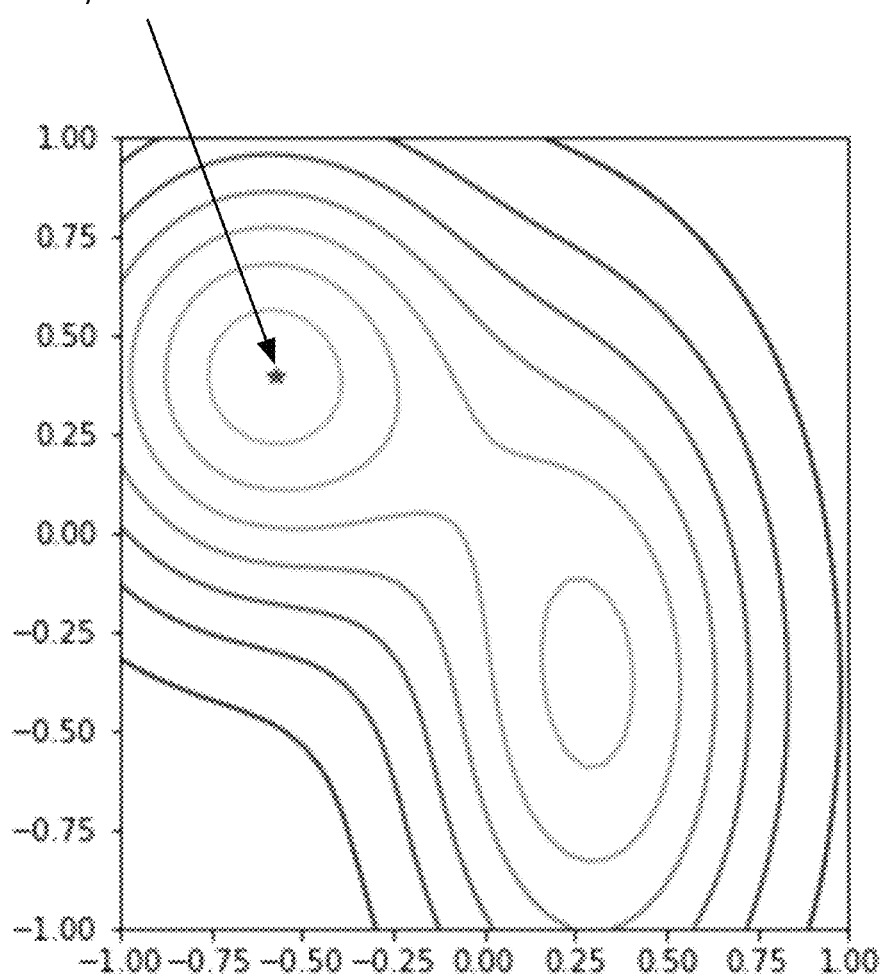
FIG. 5A illustrates an example initial optimal solution of a multi-solution optimization work request in accordance with one or more embodiments of the present application.

S240, which includes implementing an initial optimization session to identify an initial best solution or optimal suggestion, functions to implement a first optimization session via the intelligent optimization platform to identify the best and/or most optimal values for hyperparameters of the multi-solution optimization work request, as shown by way of example in FIG. 5A.

The initial optimization session may function to execute a number of optimization trials based on a portion of the optimization budget allocated in S230. Accordingly, during the optimization session, S240 may function to use an intelligent optimization platform to generate a number of suggestions for values of the hyperparameters, where the number of suggestions generated matches the (integer) number value of the allocated optimization budget for the initial optimization session for identifying an initial optimal solution. For example, for a multi-solution optimization work request that requires three (3) solutions and with an optimization budget of one hundred (100) optimization trials and with an allocation of forty (40) optimization trials for the initial optimization session, S240 may function to generate 40 suggestions for identifying an initial optimal solution. An initial best optimal solution is preferably selected from the 40 suggestions generated during the initial optimization trial. S240 may function to allocate the remaining sixty (60) optimization trials of the optimization budget of 100 according to the allocations set in S230 to generate a second set of suggestions for a second solution and a third set of suggestions for a third solution.

Accordingly, S240 may additionally function to select as a best optimal solution one suggestion among one or more suggestions generated during the initial optimization session. Preferably, the selected best optimal solution may function to optimize a performance of a subject model of a user requesting the multi-solution optimization work request.

In one implementation, S240 may function to implement the initial optimization session using the intelligent optimization platform with unadjusted models. That is, S240 may function to treat the initial optimization session as if it were a single solution optimization work request.

Figure 5B:
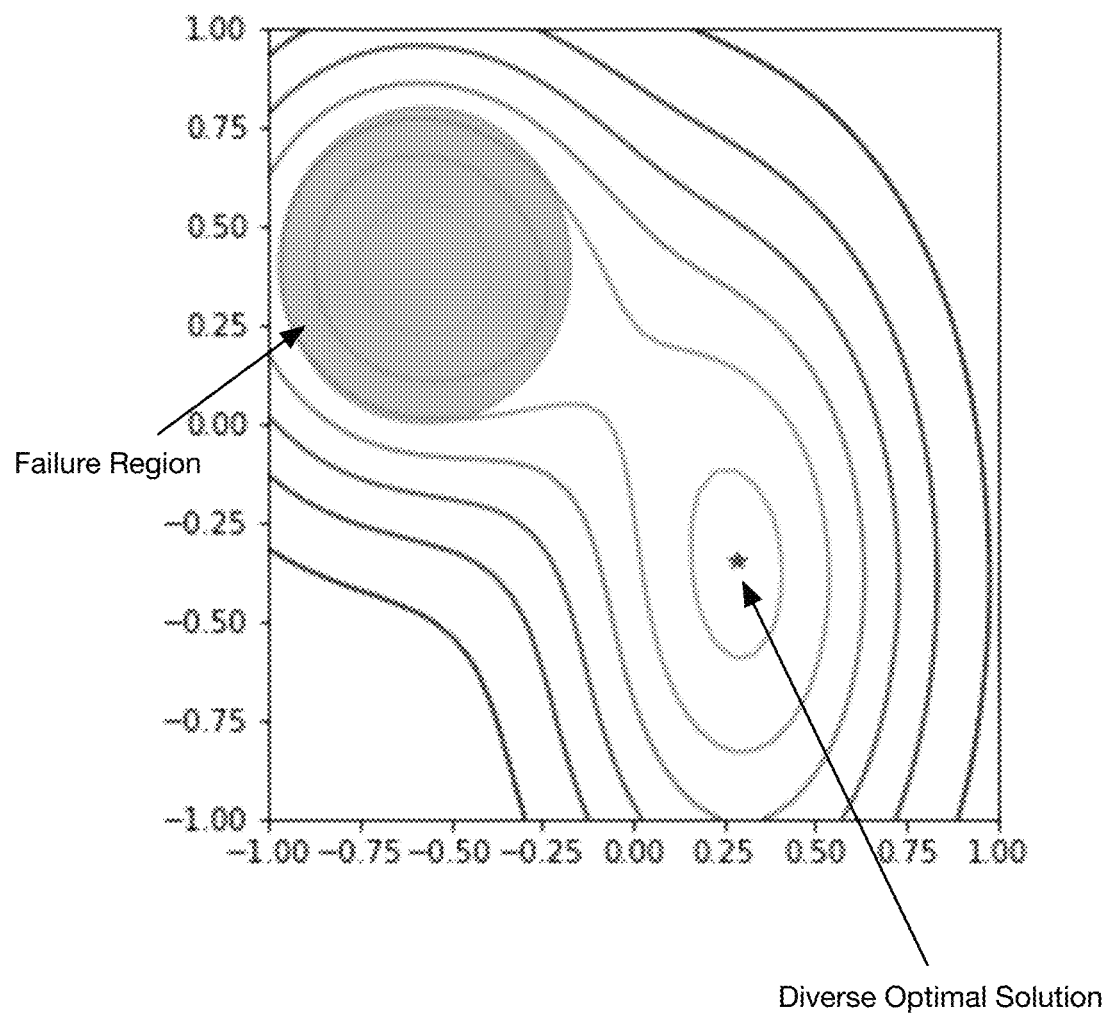
FIG. 5B illustrates an example second optimal solution with respect to an initial optimal solution of a multi-solution optimization work request in accordance with one or more embodiments of the present application.

S250, which includes identifying a failure region, functions to identify an area that surrounds the best optimal solution, as shown by way of example in FIG. 5B, within a distribution of the generated suggestions of the initial optimization session. A failure region as referred to herein preferably relates to an area, zone, or range or prospective hyperparameter values that cannot be used or set as hyperparameter values for a given solution set. A failure region may additionally be referred to herein as a restricted region, a non-exploratory zone, or a non-diversity zone, and/or the like. In such embodiments, the tuned hyperparameter values (i.e., the best optimal solution or the like) identified during the initial optimization session (i.e., first tuning session) may define a point or coordinate on a multidimensional system or the like (any suitable two dimensional space). Accordingly, in a preferred embodiment, the area that surrounds the best optimal solution may include a plurality of other possible solutions and/or prospective values the hyperparameters that were not selected as the best optimal solution. The failure region is preferably defined by a non-rectangular area or non-polygonal area that includes at least the best optimal solution of an optimization session and possibly, a plurality of other potential values for the hyperparameters. The failure region may typically be within the bounds of the optimization trials. Additionally, or alternatively, failure region may be defined by a geometric or polygonal shape, such as a square or a diamond shape, for example, that surrounds or encompasses the best optimal solution of an optimization session. It shall be noted that a general shape or dimensions of a failure region may be selected a failure region dimension spectrum or the like that ranges from zero to infinity in which each dimension along the spectrum encourages different properties of a failure region.

Additionally, S250 may function to set the dimensions of the failure region. In a first implementation, S250 may set dimensions of the failure region based on identifying a distance or radius (i.e., a radial distance) from the best optimal solution of the initial optimization session. That is, S250 may function to select a radial distance that extends from a center point defined by the best optimal solution to a peripheral edge that possibly defines an edge or point of a circle or substantially circular-shaped region.

In this first implementation, S250 may function to select a radial distance based on diversity requirements or any suitable tuning requirements of an optimization work request for the hyperparameters of a model. For instance, if it is a requirement that the subsequent or second optimal solution derived from a second optimization session has a high or increased diversity relative to the optimal solution of the first optimization session, S250 may function to set or select a radial distance that is large or otherwise, exceeds a standard radial distance threshold. By setting the radial distance far from or beyond a standard threshold distance away from the optimal solution of the initial optimization session, S250 functions to create a larger failure region or area that effectively excludes or reduces a number of hyperparameter values that can be evaluated and/or selected as a second optimal solution. In many embodiments, it may be generally understood that having an increased or large distance between hyperparameter values or solutions can increase a diversity between the two solutions whereas decreasing a distance between two solutions for hyperparameter values may reduce a diversity between the solutions.

Diverse hyperparameter solutions when implemented in a given third-party or subscriber model may allow for diverse inferences, diverse predictions, diverse classifications, and/or the like. As one example, given a third-party machine learning classifier of a natural language processing system or the like being deployed with a first optimal solution comprising a first set of hyperparameter values may generate responses of a first type based on an input and given the same third-party machine learning classifier being deployed with a diverse and/or second optimal solution set comprising a second set of diverse hyperparameter values may enable the machine learning classifier to classify and/or make predictions that are diverse or different than the instance of the classifier with the first optimal solution set when receiving the same input. A technical benefit of such multiple diverse solutions enables a model to cover a diverse space of potential responses, predictions, or classifications.

In a second implementation, S250 may set dimensions of the failure region based on identifying an elastic region that surrounds (e.g., includes or encompasses, etc.) the best optimal solution of the initial optimization session. The elastic region may be defined by an area without a constant radius that surrounds at least the best optimal solution. In this second implementation, the elastic region defining the failure region may function to shift or change with each optimization trial or hyperparameter tuning session. Accordingly, hyperparameter values identified a prior optimization or tuning trial may function to influence a shape or dimensions of a failure region.

In a third implementation, S250 may function to set or identify a failure region based on subscriber preferences, subscriber profiles, and/or any suitable attribute associated with a subscriber to the tuning service including industry-specific (e.g., global or macro attributes) attributes. That is, in some embodiments, S250 may function to inform or derive a diversity distance or the like for a given optimization or tuning session based on subscriber data (e.g., subscriber profile, industry profile, etc.). Because a sense of distance or diversity may vary between subscribers and/or subscriber industries, subscriber data may enable intelligently informed selections and/or settings of a diversity distance to achieve multiple and diverse hyperparameter solution sets tailored to the subscribers (internal) sense of distance or diversity.

Accordingly, a failure region may be set in any suitable manner including probabilistically. That is, S250 may function to evaluate multiple regions within a bound and identify a probability of failure for each of the multiple regions (e.g., a first region=90% chance of being a failure, etc.). Thus, S250 may assign a probability to any identified region within a bound of the optimization trials and generate a probability of failure for each of those regions and correspondingly, select those regions having high probabilities of failure for performing optimization trials.

Additionally, or alternatively, setting a failure region may first include normalizing dimensions of hyperparameters of a model. That is, in some circumstances, dimensions or the value ranges of two or more hyperparameters being evaluated together may have disparate dimensions. For instance, hyperparameter X values may range between 0 and 100 whereas hyperparameter Y values may range between 0 and 1. In such circumstances, prior to setting a failure region, S250 may function to normalize the dimensions of a first hyperparameter in a set of hyperparameters to the dimensions of the second hyperparameter of a set. Keeping with the above example, the prospective hyperparameter values for hyperparameter X may be normalized to a range between 0 and 1, such that the failure region can be set within dimensions between 0 and 1. Accordingly, once this unit hyperparameter value search or normalized search basis is set by S250, S250 may function to identify a failure region prior to a subsequent optimization session for a diverse or second optimal solution set.

S260, which includes implementing a subsequent (dependent) optimization session to identify a successive best or optimal suggestion, functions to implement a successive optimization session via the intelligent optimization platform to identify another best and/or most optimal values for hyperparameters of the multi-solution optimization work request. Preferably, the identified best and/or most optimal hyperparameters is sufficiently diverse from the best solution or optimal suggestion identified in S240. As shown in FIG. 5B, the best and/or most optimal hyperparameters identified in S260 may be found outside of the identified failure region and of distance sufficient from the failure region and initial optimal suggestion to be considered diverse.

The successive optimization session may function to execute a number of optimization trials based on a portion of the optimization budget allocated in S230. Accordingly, during the optimization session, S260 may function to use the intelligent optimization platform to generate a number of suggestions for values of the hyperparameters, where the number of suggestions generated matches the number value of the allocated optimization budget for the initial optimization session.

Additionally, S260 may function to set a failure region for the successive optimization session based on the failure region identified in S250. Accordingly, the failure region that surrounds the best optimal solution for the initial optimization session is used to exclude possible values for a best optimal solution of the successive optimization session.

In a first implementation, S260 may function to use the failure region identified in S250 to adjust the one or more optimization models of and/or a method of operating the intelligent optimization platform. That is, in some embodiments, the failure region may be used to adjust hyperparameters, weights, factors, values, and the like used in one or more optimization models used by the intelligent optimization engine when identifying suggestions for the hyperparameter values of the multi-solution work request. Specifically, the values and hyperparameters of the one or more optimization models may be modified or adjusted such that, the intelligent optimization platform avoids generating suggestions in the failure region or alternatively, generates suggestions in the failure region but does not count the suggestions generated in the failure region as viable options by marking or flagging the non-viable solutions. Additionally, or alternatively, the intelligent optimization platform may function to generate a best curve or the like that excludes a consideration of suggestions (or points) within the failure region.

In this first implementation, once a failure region is set, S260 may function to generate one or more suggestions during the successive optimization session using the adjusted optimization models of the intelligent optimization platform. S260 may function to select one suggestion of the generated suggestions of the successive optimization session having a best and/or most optimal values.

In a second implementation, S260 may function to set the failure region identified in S250 to exclude or mark suggestions generated in the successive optimization session as un-selectable suggestions for a best optimal solution for the successive optimization session. For instance, S260 may function to generate suggestions for hyperparameter values for the successive optimization session. In such instance, S260 may function to apply the failure region to a distribution of the generated suggestions for the session thereby preventing a selection of suggestions that lie within the failure region.

One or more instances of the method and/or processes described herein can be performed asynchronously (e.g., sequentially), concurrently (e.g., in parallel), or in any other suitable order and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system to tune hyperparameters to improve an effectiveness including one or more of accuracy and computational performances of a machine learning model, the system comprising:
   memory; and
   a machine learning-based tuning service that is hosted on a distributed networked system, the machine learning-based tuning service to:
      access a tuning work request to tune two or more hyperparameters of the machine learning model;
      perform a first tuning of the two or more hyperparameters in a hyperparameter space, the hyperparameter space including a plurality of hyperparameter values for the two or more hyperparameters;

identify, within a first tuning region of the hyperparameter space, ones of the hyperparameter values for the two or more hyperparameters based on the first tuning;

set a multidimensional shaped failure region within the hyperparameter space as a polygonal shape based on identified ones of the hyperparameter values as coordinates of the polygonal shape, the multidimensional shaped failure region including:
  (i) the identified ones of the hyperparameter values for the two or more hyperparameters, and
  (ii) a subset of the plurality of hyperparameter values that encompasses the identified ones of the hyperparameter values;

use the multidimensional shaped failure region to set:
  (a) the subset of the plurality of hyperparameter values, and (b) the identified ones of the hyperparameter values within the multidimensional shaped failure region, by setting both (a) and (b) to failure for a second tuning of the two or more hyperparameters;

perform the second tuning of the two or more hyperparameters in a second tuning region of the hyperparameter space based on setting the multidimensional shaped failure region;

identify diverse ones of the hyperparameter values for the two or more hyperparameters based on not selecting any of the subset of the plurality of hyperparameter values within the multidimensional shaped failure region; and return the identified ones of the hyperparameter values and the diverse ones of the hyperparameter values for the machine learning model.

2. The system according to claim 1, wherein the first tuning region includes a predetermined range of hyperparameter values for ones of the two or more hyperparameters of the tuning work request.

3. The system according to claim 2, wherein the second tuning region includes the predetermined range of hyperparameter values for the ones of the two or more hyperparameters of the tuning work request excluding the subset of hyperparameter values for the ones of the two or more hyperparameters within the multidimensional shaped failure region.

4. The system according to claim 1, wherein: (i) the identified ones of the hyperparameter values define a point on a multidimensional coordinate system, and (ii) setting the multidimensional shaped failure region as the polygonal shape includes identifying an area in the hyperparameter space that surrounds the identified ones of the hyperparameter values.

5. The system according to claim 1, wherein the machine learning-based tuning service is to set the multidimensional shaped failure region by:
  identifying a distance from the identified ones of the hyperparameter values; and
  defining the polygonal shape encompassing the identified ones of the hyperparameter values based on the distance, the multidimensional shaped failure region is set to an area within the polygonal shape and the subset of the plurality of hyperparameter values within the polygonal shape are set to failure during the second tuning.

6. The system according to claim 5, wherein the machine learning-based tuning service is to set the multidimensional shaped failure region by:
  setting dimensions of the multidimensional shaped failure region including identifying an elastic region that surrounds the identified ones of the hyperparameter values of the first tuning, the multidimensional shaped failure region is set to an area within the elastic region and the subset of the plurality of hyperparameter values within the polygonal shape are set to failure during the second tuning.

7. The system according to claim 5, wherein the distance is derived based on subscriber data of a subscriber to the machine learning-based tuning service.

8. The system according to claim 1, wherein the machine learning-based tuning service is to: use the multidimensional shaped failure region to adjust one or more parameters of one or more tuning sources operated by the machine learning-based turning service to identify the ones of the hyperparameter values for the two or more hyperparameters of the tuning work request.

9. The system according to claim 1, wherein performing the second tuning includes:
  setting a tuning distance that defines a position of the second tuning region away from the first tuning region and the multidimensional shaped failure region, the second tuning satisfies or exceeds a diversity threshold.

10. The system according to claim 1, wherein the machine learning-based tuning service implements an intelligent hyperparameter tuning system, the intelligent hyperparameter tuning system including:
  a cluster of distinct machine learning tuning sources that perform distinct tuning operations of the two or more hyperparameters of the machine learning model;
  a plurality of queue worker machines that selectively operate one or more of the cluster of distinct machine learning tuning sources based on a receipt of the tuning work request, the plurality of queue worker machines including a plurality of distinct queue worker machines that operate asynchronously to perform disparate tuning operations using one or more of the cluster of distinct machine learning tuning sources;
  a shared work queue that is accessible by each of the plurality of distinct queue worker machines, the shared work queue including an asynchronous queue that enables asynchronous tuning operations by the plurality of queue worker machines; and
  a platform database including a central repository that collects tuning data generated during tuning sessions of the two or more hyperparameters of the machine learning model.

11. The system according to claim 1, wherein the performing of the second tuning includes:
  applying the multidimensional shaped failure region to a distribution of the plurality of hyperparameter values; and
  excluding the subset of the plurality of hyperparameter values and the identified ones of the hyperparameter values from the distribution based on the applying of the multidimensional shaped failure region.

12. The system according to claim 1, wherein the machine learning-based tuning service is to:
  use the multidimensional shaped failure region to set tuning parameters that cause the machine learning-based tuning service to avoid, during the second tuning, generating the subset of the plurality of hyperparameter values that lie within a multidimensional shape of the multidimensional shaped failure region as hyperparameter values for the diverse ones of the hyperparameter values for the two or more hyperparameters.

13. The system according to claim 1, wherein the machine learning-based tuning service is to: normalize a dimension of a first hyperparameter of the two or more hyperparameters to a dimension of a second hyperparameter of the two or more hyperparameters, the multidimensional shaped failure region is set in response to the normalization.

14. The system according to claim 1, wherein the machine learning-based tuning service is to:
generate, during the second tuning, additional hyperparameter values that lie within the multidimensional shaped failure region, and
mark each of the hyperparameter values in the multidimensional shaped failure region as non-viable hyperparameter values for the diverse ones of the hyperparameter values.

15. The system according to claim 1, wherein the machine learning-based tuning service is to:
generate a distribution of a plurality of hyperparameter values based on the first tuning;
apply the multidimensional shaped failure region to the distribution of hyperparameter values; and
prevent, during the second tuning, a selection of a subset of the plurality of hyperparameter values of the distribution that is within the multidimensional shaped failure region.

16. The system according to claim 1, wherein the machine learning-based tuning service is to: identify a best curve along hyperparameter values within the hyperparameter space that excludes from the best curve a plurality of hyperparameter values within the multidimensional shaped failure region.

17. The system according to claim 1, wherein a dimension of the multidimensional shaped failure region ranges from zero to infinity, and the dimension corresponds to different properties of the multidimensional shaped failure region.

18. The system according to claim 1, wherein the identified ones of the hyperparameter values influence a shape or dimensions of the multidimensional shaped failure region.

19. The system according to claim 1, wherein the machine learning-based tuning service is to set the multidimensional shaped failure region by defining a second region within the hyperparameter space in which the identified ones of the hyperparameter values of the first tuning define a point and a shape that surrounds the point.

20. The system according to claim 1, wherein the multidimensional shaped failure region is elastic, and in response to an additional hyperparameter tuning session, the machine learning-based tuning service to change the elastic multidimensional shaped failure region, wherein the identified ones of the hyperparameter values from a previous hyperparameter tuning session influence the shape of the elastic multidimensional shaped failure region.

21. A method to tune hyperparameters to improve an effectiveness including one or more of accuracy and computational performances of a machine learning model, the method comprising:
receiving a tuning work request to tune two or more hyperparameters of the machine learning model;
performing, by a machine learning-based tuning service, a first tuning of the two or more hyperparameters in a hyperparameter space, the hyperparameter space including a plurality of hyperparameter values for the two or more hyperparameters;
identifying, within a first tuning region of the hyperparameter space, ones of the hyperparameter values for the two or more hyperparameters based on the first tuning;
setting a multidimensional shaped failure region within the hyperparameter space as a polygonal shape based on identified ones of the hyperparameter values as coordinates of the polygonal shape, the multidimensional shaped failure region including:
(i) the identified ones of the hyperparameter values for the two or more hyperparameters, and
(ii) a subset of the plurality of hyperparameter values that encompasses the identified ones of the hyperparameter values;
using the multidimensional shaped failure region to set:
(a) the subset of the plurality of hyperparameter values, and (b) the identified ones of the hyperparameter values within the multidimensional shaped failure region, by setting both (a) and (b) to failure for a second tuning of the two or more hyperparameters;
performing, by the machine learning-based tuning service, the second tuning of the two or more hyperparameters in a second tuning region of the hyperparameter space based on setting the multidimensional shaped failure region;
identifying diverse ones of the hyperparameter values for the two or more hyperparameters based on not selecting any of the subset of the plurality of hyperparameter values within the multidimensional shaped failure region; and
returning the identified ones of the hyperparameter values and the diverse ones of the hyperparameter values for the machine learning model.

22. A non-transitory computer-readable medium comprising instructions that, when executed, cause at least one processor to at least:
receive a tuning work request to tune two or more hyperparameters of a machine learning model;
perform, by a machine learning-based tuning service, a first tuning of the two or more hyperparameters in a hyperparameter space, the hyperparameter space including a plurality of hyperparameter values for the two or more hyperparameters;
identify, within a first tuning region of the hyperparameter space, ones of the hyperparameter values for the two or more hyperparameters based on the first tuning;
set a multidimensional shaped failure region within the hyperparameter space as a polygonal shape based on identified ones of the hyperparameter values as coordinates of the polygonal shape, the multidimensional shaped failure region including:
(i) the identified ones of the hyperparameter values for the two or more hyperparameters, and
(ii) a subset of the plurality of hyperparameter values that encompasses the identified ones of the hyperparameter values;
use the multidimensional shaped failure region to set: (a) the subset of the plurality of hyperparameter values, and (b) the identified ones of the hyperparameter values within the multidimensional shaped failure region, by setting both (a) and (b) to failure for a second tuning of the two or more hyperparameters;
perform, by the machine learning-based tuning service, the second tuning of the two or more hyperparameters in a second tuning region of the hyperparameter space based on setting the multidimensional shaped failure region;
identify diverse ones of the hyperparameter values for the two or more hyperparameters based on not selecting any of the subset of the plurality of hyperparameter values within the multidimensional shaped failure region; and return the identified ones of the hyperparameter values and the diverse ones of the hyperparameter values for the machine learning model.

23. The non-transitory computer-readable medium of claim 22, wherein the multidimensional shaped failure region is elastic, and in response to an additional hyperparameter tuning session, the instructions are to cause the at least one processor to change, by the machine learning-based tuning service, the elastic multidimensional shaped failure region, the identified ones of the hyperparameter values from a previous hyperparameter tuning session to influence the shape of the elastic multidimensional shaped failure region.

24. The non-transitory computer-readable medium of claim 22, wherein the instructions are to cause the at least one processor to:

normalize a dimension of a first hyperparameter of the two or more hyperparameters to a dimension of a second hyperparameter of the two or more hyperparameters; and set the multidimensional shaped failure region in response to the normalization.

\* \* \* \* \*